United States Patent [19]
Wuertz

[11] Patent Number: 5,272,278
[45] Date of Patent: Dec. 21, 1993

[54] POKE-THROUGH WIRING FITTING WITH FLAP COVER ASSEMBLY

[75] Inventor: Emil S. Wuertz, Madison, Conn.

[73] Assignee: Hubbell Incorporated, Orange, Conn.

[21] Appl. No.: 921,576

[22] Filed: Jul. 30, 1992

[51] Int. Cl.⁵ .............................................. H02G 3/22
[52] U.S. Cl. ......................................... 174/48; 174/67
[58] Field of Search ................... 174/48, 67; 52/220.8

[56] References Cited

U.S. PATENT DOCUMENTS

| | | | |
|---|---|---|---|
| 4,443,654 | 4/1984 | Flachbarth et al. | 174/48 |
| 4,770,643 | 9/1988 | Castellani et al. | 174/48 X |
| 4,883,924 | 11/1989 | Hadfield | 174/48 |
| 5,032,690 | 7/1991 | Bloom | 174/48 |
| 5,064,969 | 11/1991 | Bloom | 174/67 |

*Primary Examiner*—Leo P. Picard
*Assistant Examiner*—David A. Tone
*Attorney, Agent, or Firm*—Jerry M. Presson; Anthony C. Scott

[57] ABSTRACT

An in-floor multiple-service wiring device and, more particularly, a poke-through wiring fitting incorporating a novel flap cover assembly, and which fitting is adapted to be positioned in a floor aperture of a concrete building floor for the conductance of electrical power and telecommunication signals between the work spaces of multi-storied buildings. The flap cover assembly incorporates an upper cover plate consisting of metallic material, preferably such as brass or the like, and a lower cover plate, preferably constituted from a rigid molded plastic material and which is fastened to the upper plate member in surface contact with the rear face thereof. Hereby, aligned apertures are formed in both the upper and lower cover plate members, and with metallic flap covers being hingedly connected to the cover plate assembly so as to essentially be able to close off the apertures formed therein which are superimposed on the somewhat smaller-dimensioned aligned apertures formed in the lower plastic plate member, and whereby cooperative connecting structure for resiliently biasing the flap covers into normally closed positions are operatively interposed between the upper and lower cover plate members during assembly of the plate members.

14 Claims, 5 Drawing Sheets

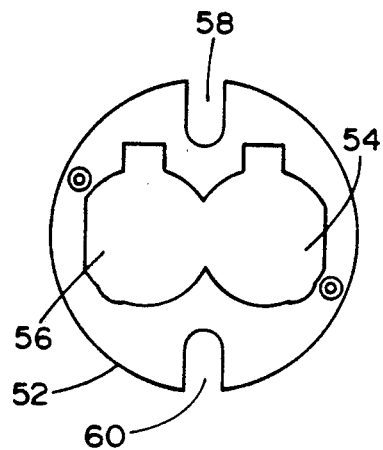
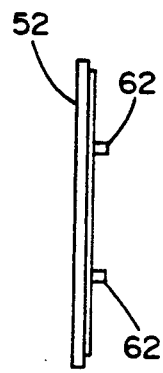
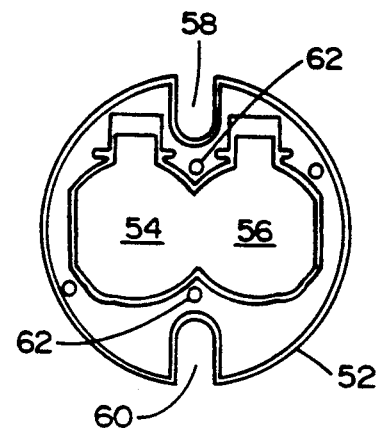
FIG.7　　　　FIG.8　　　　FIG.9
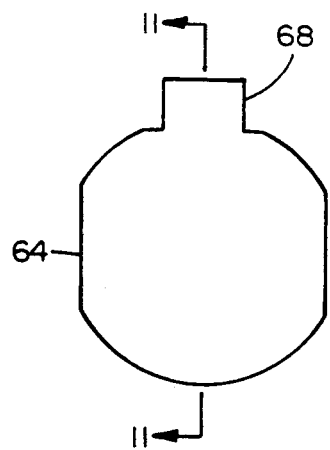
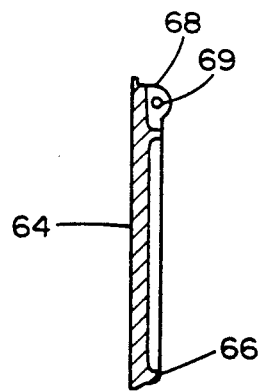
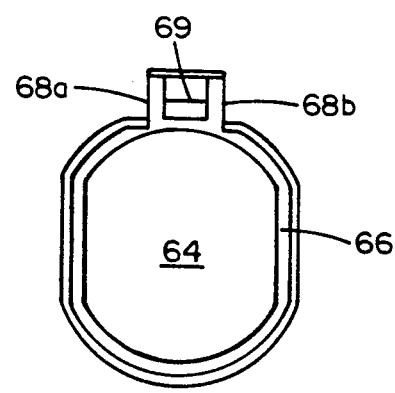
FIG.10　　　　FIG.11　　　　FIG.12

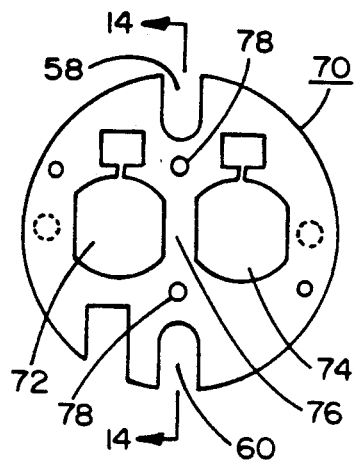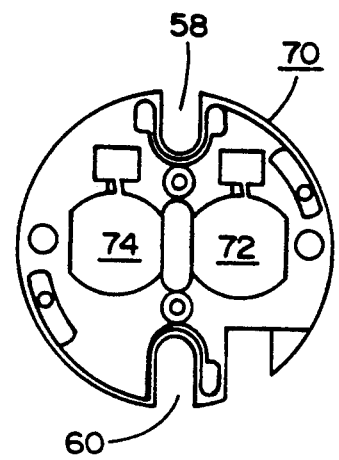
FIG.13          FIG.14          FIG.15
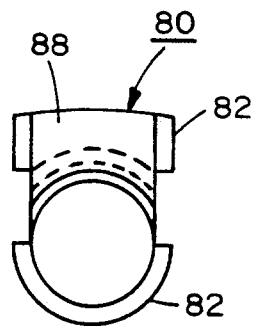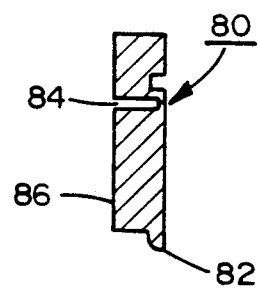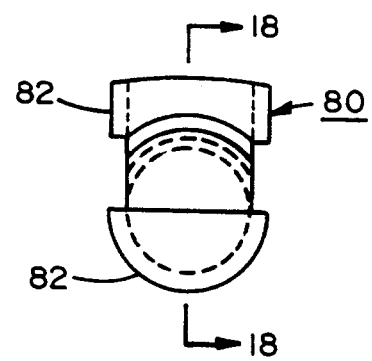
FIG.16          FIG.18          FIG.17

POKE-THROUGH WIRING FITTING WITH FLAP COVER ASSEMBLY

BACKGROUND OF THE INVENTION

1. Field of the Invention

The present invention relates, in general, to an in-floor multiple-service wiring device and, more particularly, pertains to a poke-through wiring fitting incorporating a novel flap cover assembly, and which fitting is adapted to be positioned in a floor aperture of a concrete building floor for the conductance of electrical power and telecommunication signals between the work spaces of multi-storied buildings.

In essence, during the erection of building structures of various types; for instance, such as modern multi-storied office buildings possessing concrete floors, it is frequently necessary, and also commonly accepted building practice, to normally provide fire-rated poke-through fittings and devices for conducting insulated conductors, wires, cables and the like, which are employed for the transmission of electrical power and telecommunication signals through suitable holes or apertures which are formed in concrete building floors, and whereby electrical power and other kinds of signals, such as telecommunication signals, may be readily transmitted from a suitable source; for instance, from a junction box located at or proximate one face of the concrete floor through the intermediary of the poke-through fitting, through the aperture in the concrete building floor to a suitable outlet or service head which is located at the opposite face of the floor.

Depending upon the type of installation required for the service head or outlet which is located at the face of the floor opposite from that towards the junction box, at frequent instances of installation, the service head is adapted to be mounted flush on the surface of the floor or on a carpet which covers the floor; in which case, the service head or outlet is ordinarily mounted in a cover plate encompassed by a metallic or brass carpet flange or other suitable flange structure. Hereby, such carpet flanges, while protecting the cover plate structure for the outlet or service head, also provide for a smooth and aesthetically pleasing decorative surface appearance which, to an appreciable degree, will prevent an occupant or persons walking over the carpeted floor space from tripping on the service head and possibly sustaining some injury. Moreover, the service head should also be adapted to enable the passage therethrough of various cables, such as for telecommunications and telephone signals, while providing for ready access to plug connectors enabling the connection of electrical wires leading to suitable lamps, computers and/or word processors.

2. Discussion of the Prior Art

Although various types of service heads of the type under consideration herein are currently in widespread use in the building industry, particularly such as incorporating cover assemblies fastened in either brass or plastic carpet or floor flanges which are flush mounted on a carpet or floor, and which assemblies provide for cover plate structure communicating with plug connectors and/or openings for telecommunication cables leading from a junction box to the floor aperture through the service head, none of these prior art structures provide for a composite brass and plastic flap cover assembly having metallic flap covers normally resiliently biased into closed positions. These flap covers inhibit the ingress of dirt, dust and contaminants to the plug connectors and the fitting components contained within the floor aperture when not in use, while providing a smooth surface of an aesthetically highly pleasing appearance, and which will concurrently ameliorate the danger or hazard of an occupant of the workspace tripping over such service head.

Thus, among various types of poke-through wiring fittings which are equipped with service heads or outlets adapted to be positioned fastened in place on or proximate the face of a floor or on a carpeted floor surface, and which generally incorporate a closure plate or cover plate assembly fastened to a carpet or floor flange, Castellani, et al. U.S. Pat. No. 4,770,643 disclose an in-floor fitting, wherein a carpet flange has a central recessed portion containing an opening, in which recessed portions there is positioned a closure plate, the latter of which includes removable or break-out plugs for enabling the through-passage of insulated cables, and includes plate portions having plug connector sockets formed therein. Although this provides for a relatively smooth surface in combination with the carpet flange when mounted on a carpet or building floor surface, the openings of the socket connectors adapted to receive the plug prongs are always exposed to the surroundings, thereby allowing for the ingress of dust and other contaminants which; in essence, can conceivably ultimately prevent the presence of an appropriate electrical contact between socket connectors and plug prongs and/or constitute a hazard of fire due to carpet fibers being forced into the electrical connector portions.

Similarly, Castellani, et al. U.S. Pat. No. 4,827,080 disclose a carpet flange as a component of a service head adapted to be fastened to a top plate of the poke-through fitting, and in which a molded plastic cover insert is adapted to be positioned in a recessed central cutout of the carpet flange and fastened thereto by means of suitable screw members and the like. However, as in the case of the previously-discussed Castellani, et al. U.S. Pat. No. 4,770,643, the electrical socket connectors for receiving the plug prongs are continually exposed and potentially subject to the ingress of and contamination by dust and/or other dirt particles, thereby rendering this service head subject to the same drawbacks and disadvantages.

Morgan U.S. Pat. No. 5,107,072 discloses a flush-mounted service head for a poke-through fitting, including a carpet flange in which there is fastened a cover plate for the poke-through in-floor fitting, and wherein the cover plate possesses break-out plugs for enabling the through-passage of insulated cables, and also provides for molded electrical socket plug connectors. However, as in the previously-discussed patents, the prong-receiving openings of the plug connectors are constantly exposed to the surroundings while; moreover, the portion of the cover plate containing the break-through plugs is somewhat recessed relative to the surfaces of the plug connectors, thereby producing an uneven exposed and partially recessed upper surface which can conceivably cause an occupant or person utilizing the floor space and walking over the service head to trip and sustain injuries, while also providing a dirt or dust-collecting environment.

A somewhat more pertinent construction relative to a service head incorporating a flap cover of generally the type considered herein is disclosed in Bloom U.S. Pat.

No. 5,032,690, wherein a carpet flange of an in-floor fitting or poke-through connector assembly is preferably constituted of a metallic material, and which includes a central aperture and a circular disc-shaped cover plate having break-out plugs extending radially inwardly from the plate rim for the through-passage of insulated cables, and with pivotable flap covers being positionable over plug connectors. However, in this particular instance, the cover plate structure is formed from a single piece preferably consisting of a metallic material, such as brass, which necessitates the implementing of expensive and complex manufacturing and attaching procedures for the flap covers, while utilize extremely thick and heavy brass material for the plate structure, thereby rendering the entire assembly extremely expensive and complicated in its manufacture, particularly with regard to the attachment for the pivotably closable and openable flap covers to the fitting cover plate.

SUMMARY OF THE INVENTION

Accordingly, in order to eliminate or considerably ameliorate the limitations and drawbacks encountered in prior art constructions of service heads for in-floor or poke-through wiring fittings of the type described herein, in which a flap cover plate assembly for the fitting is mountable in a metallic, such as a brass carpet flange or the like to enable it to be positioned fastened in place in an essentially flush or low-profiled relationship on a carpeted floor surface. Hereby, the flap cover plate assembly incorporates an upper cover plate consisting of metallic material, preferably such as brass or the like, and a lower cover plate, preferably constituted from a rigid molded plastic material and which is fastened to the upper plate member in surface contact with the rear face thereof. Hereby, aligned apertures are formed in both the upper and lower cover plate members, and with metallic flap covers being hingedly connected to the cover plate assembly so as to essentially be able to close off the apertures formed therein which are superimposed on the somewhat smaller-dimensioned aligned apertures formed in the lower plastic plate member, and whereby cooperative connecting structure for resiliently biasing the flap covers into normally closed positions are operatively interposed between the upper and lower cover plate members during assembly of the plate members. The composite cover plate construction of the flap cover plate assembly is fitted into a central recessed opening of the carpet flange so as to provide an upper flat surface which is extensively in coplanar relationship with the uppermost portion of the carpet flange, and wherein the lower surface of the lower cover plate member is adapted to be positioned on an upper mounting flange of the poke-through fitting and fastened thereto through the intermediary of fasteners, such as screw members passing through the cover plate assembly. Moreover, the composite flap cover plate assembly includes radially inwardly extending slots which are adapted to each to receive removable break-out plugs for the selective through-passage of insulated low-voltage cables or wires, usually those employed for telecommunication equipment, upon the installation of the wiring fitting in a floor aperture, and with the flap covers in the upper plate member being in alignment with socket plug connectors of the fitting extending upwardly into the therewith aligned apertures formed in the lower or bottom plate member so as to provide protection against the ingress of dust and/or dirt when the flap covers are in a downwardly pivoted closed position in the upper plate member.

The utilization of a flap cover plate assembly having a composite structure of preferably differing materials renders the entire flap cover structure simple to assemble and inexpensive in its manufacture, especially in connection with mass-production techniques, while on the other hand, providing for an upper plate member and flap covers constituted of metal, such as brass, similar to the metallic material of the carpet flange to thereby render the appearance thereof rugged and wear-resistant while being aesthetically pleasing in appearance.

Accordingly, it is an object of the present invention to provide a poke-through wiring fitting for installation in the aperture of a concrete building floor, which possesses a service head including a novel and unique flap cover plate assembly which is assembled from composite metallic and plastic material components.

Another object of the present invention is to provide a novel flap cover assembly for a wiring fitting of the type described herein, wherein flap covers are installed in the flap cover plate structure so as to be normally biased into a closed position through the intermediary of suitable biasing elements.

Yet another object of the present invention is to provide a flap cover plate assembly of composite construction which is adapted to be installed mounted in a carpet flange so as to constitute a service head for a poke-through wire fitting mounted in an aperture extending through the floor of a building structure, wherein the flap cover plate assembly includes an upper plate structure, flap covers and break-through plug members which are preferably constituted from a metal similar to that of the carpet flange, wherein a lower cover plate member of a molded plastic material is fastened to the lower surface of the upper plate material, and including resilient biasing structure operatively connected between the upper and lower plate members and the flap covers for normally biasing the flap covers into a closed condition coplanarly within the upper plate member.

BRIEF DESCRIPTION OF THE DRAWINGS

Reference may now be had to the following detailed description of an embodiment of a poke-through in-floor wire fitting, and particularly the service head including a flap cover assembly thereof, taken in conjunction with the accompanying drawings; in which:

FIG. 7 is a top plan view of the upper plate member of the flap cover plate assembly;

FIG. 8 is a side view of the assembly of FIG. 7;

FIG. 9 is a bottom view of the assembly of FIG. 7;

FIG. 10 illustrates a top plan view of one of the flap covers which are to be installed in the flap cover plate assembly of FIGS. 4 through 6;

FIG. 11 is a section taken along line 11—11 in FIG. 10;

FIG. 12 is a bottom plan view of the flap cover shown in FIG. 10;

FIG. 13 is a top plan view of the lower plate member of the flap cover plate assembly;

FIG. 14 is a section taken along line 14—14 in FIG. 13;

FIG. 15 is a bottom plan view of the lower cover plate member;

FIG. 16 illustrates a top plan view, shown on an enlarged scale; of a removable break-through flap cover plug;

FIG. 17 is a bottom plan view of the flap cover plug of FIG. 16;

FIG. 18 is a section taken along line 18—18 in FIG. 17;

DETAILED DESCRIPTION

Figure 2:
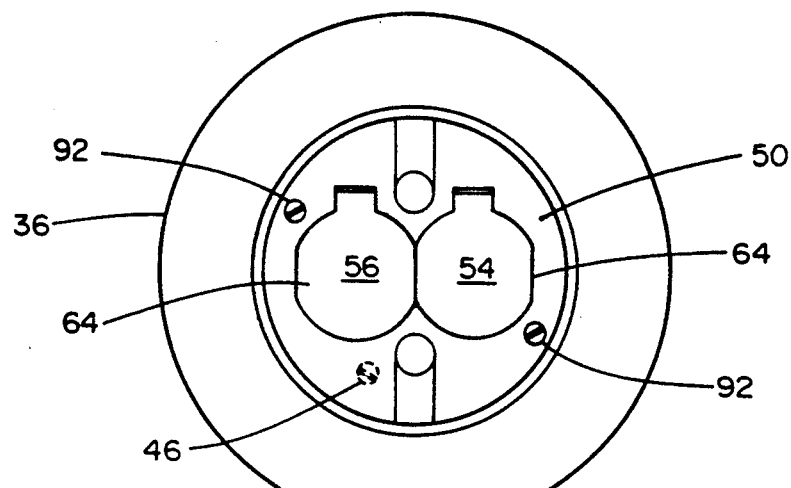
FIG. 2 is a top plan view of the service head of the fitting incorporating the inventive flap cover plate assembly.
Figure 1:
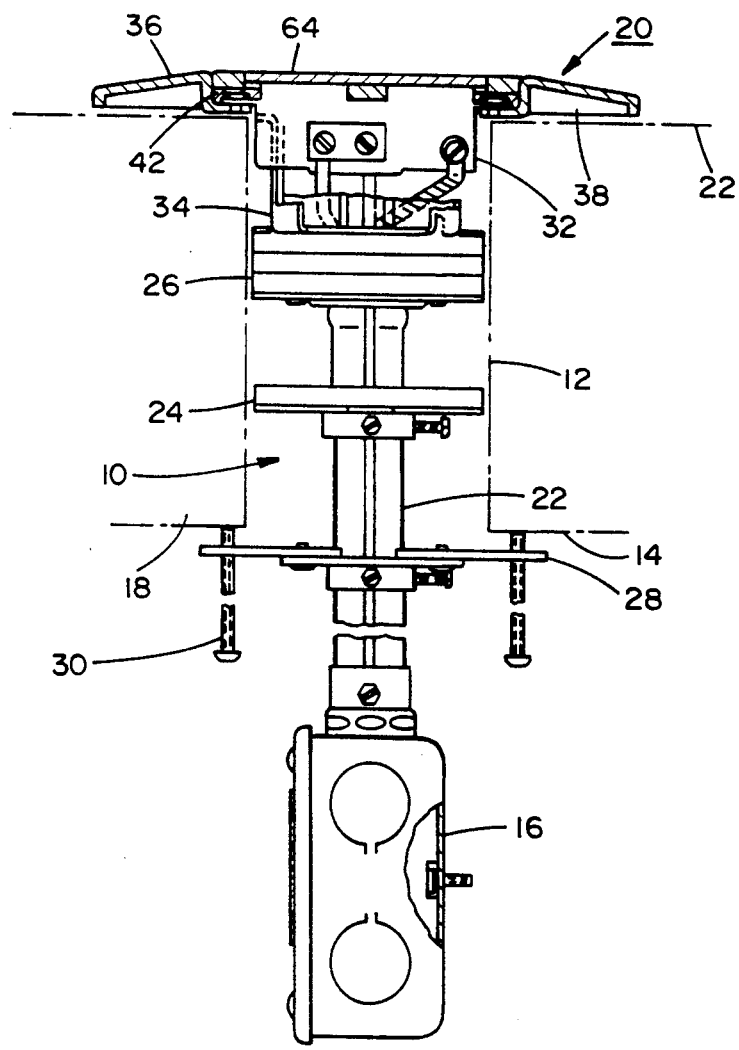
FIG. 1 illustrates, in a generally diagrammatic representation, a longitudinal view, shown partly in section, of a poke-through fire-retardant wire fitting, incorporating a service head with a flap cover plate assembly of the type pursuant to the invention.

Referring now in more extensive particularity to the drawings, and particularly to FIGS. 1 and 2, there is disclosed a typical exemplary poke-through fire-retarding wiring fitting 10 which is adapted for insertion through an aperture or passageway 12 which is formed in a concrete floor 14 of a building structure; for instance, such as an a multi-storied office building, manufacturing plant, or the like. The aperture or passageway 12 which extends through the building floor 14 facilitates the transfer of suitable cables. insulated wires and telecommunication signals from a junction box 16 which is positioned below the bottom face 18 of the concrete floor 14 to an outlet or service head 20 located at the opposite or upper face 22 of the floor 14. For purpose of clarity, such cables and insulated wires which are employed for the transmission of electrical power and for telecommunication systems from one floor to another floor of the building through the aperture 12 are not illustrated in specific detail in the drawings as being unnecessary for an understanding of the invention.

Extending between the junction box 16 and the service head 20 are one or more suitable tubular conduits 22 housing various electrical conductors and insulated wires which are used for the transmission of electrical power and telecommunication signals, and having supported thereon suitable fire barrier elements 24 and 26, which may be in the nature of either individual intumescent material discs 24 and/or a plurality of such superimposed discs 26 attached to suitable support plates for clamping engagement therebetween so as to form a fire barrier through an expansion of the intumescent disc material upon heat and/or fire being encountered in the aperture 12, so as to prevent or retard fire from being transmitted from one floor to another, as is known in this particular technology.

In order to fixedly position the fitting 10 within the aperture 12 in concrete floor 14, the fitting may be clampingly engaged therein by having the upper end 20 thereof contact the surface 22 of the floor 14, while a toggle assembly consisting of a plate 28 with clamping screw members 30 extending therethrough is tightened to exert on axial force against the fitting so as to produce a clamping connection with the floor 14.

Figure 3:
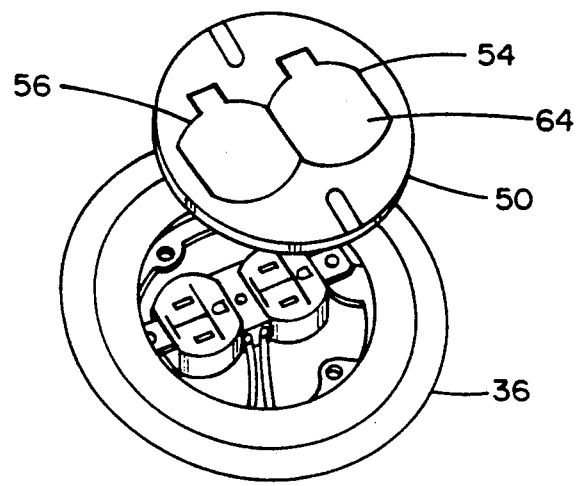
FIG. 3 illustrates, in a perspective exploded view, a top plan view of the flap cover plate member prior to its installation in a carpet flange.
Figure 4:
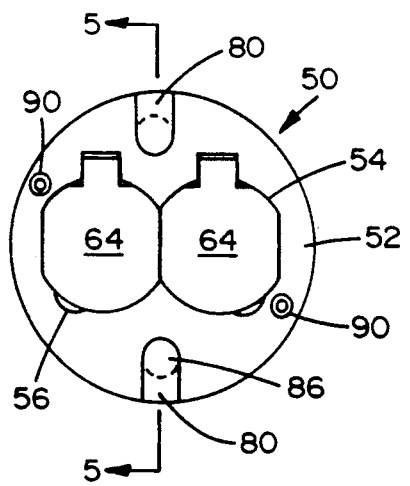
FIG. 4 illustrates a top plan view of the flap cover plate assembly with break-through plug inserts having been removed therefrom.

The end of the tubular conduit or conduits 22 proximate the service head 20 terminates in a receptacle 32 having suitable socket plug connectors therein, as may be more clearly ascertained from FIG. 3 of the drawings, described hereinbelow.

Moreover, a cup-shaped insulator housing and floor plate arrangement 34 extends between the intumescent disc assembly 26 and the surface 22 of the floor 14 about the aperture 12 so as to have the carpet flange fastened thereto as herein described.

Hereby, in connection with the foregoing, the carpet flange 36, which is essentially a frusto-conically-shaped disc in transverse cross-section, and having a central opening is positioned on or close to the floor 22 in order to permit the outer peripheral portion 38 of the carpet flange to engage over a carpet which is located on the surface 22 of floor 14. In essence, as illustrated in detail in FIGS. 19 and 20, the carpet flange 36 is of an essentially widely-employed disc-shaped construction, in which the radially outer circumferential portion 40 possesses an essentially frusto-conical configuration in transverse cross-section, and with the central portion being an essentially cup-shaped recess 42 with an opening 44 therein, and in which the portion 42 includes through apertures 46 for fastening to a suitable floor plate which is part of the upper end of receptacle 32. The lower surface of the peripheral flange portion 40 is adapted to be supported on carpeting covering the surface 22 of the floor 14, as is well known in the art, although it may also rest on a wooden or tiled floor. The circular carpet flange 36 is sized as desired in conformance with specific customer demands.

Within the confines of the cup-shaped recess 42 of the carpet flange 36 there is adapted to be installed the flap cover plate assembly 50 pursuant to the invention, as described in detail in connection with FIGS. 4 through 18 of the drawings. Hereby, the flap cover plate assembly 50 is provided with diametrically oppositely spaced tapped holes 90 which engage the threaded portions of fastening screws 92 extending through openings in the bottom wall surface of the cup-shaped portion of flange 36, as shown in FIG. 2 of the drawings.

Figure 19:
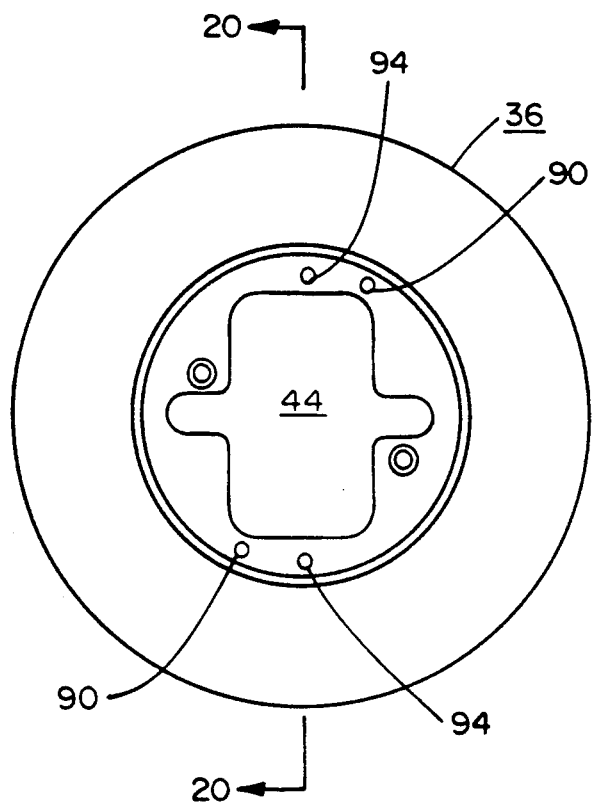
FIG. 19 illustrates a top plan view of a carpet flange in which the flap cover plate assembly structure is adapted to be installed.
Figure 20:
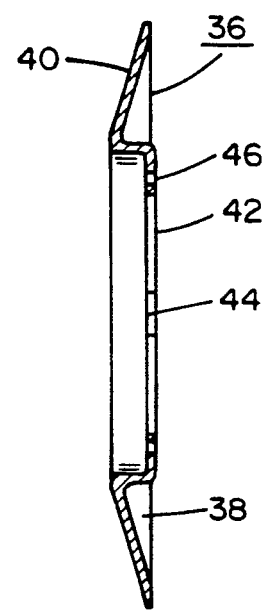
FIG. 20 is a section taken along line 20—20 in FIG. 19.

Moreover, as shown in FIG. 19, provision is made for fastening screws 94 for attaching and mounting the receptacle 32 of the fitting, as is well known in the technology.

Hereby, the flap cover plate assembly 50 is constituted of a structure consisting of a composite of materials, including a first or upper circular plate member 52 which is constituted from a metallic material, preferably such as solid brass, which is similar to or identical with the material employed for the carpet flange 36. Moreover, the surface finish of the upper surface of this particular upper plate member 52 is either polished, burnished or brush-finished in order to provide a decorative appearance identical with that of the carpet flange 36 so as to impart a continual smooth-surfaced appearance thereto which is aesthetically attractive. The upper plate member 52 includes two contiguous cutouts 54 and 56 in the center region thereof, as shown more specifically in FIGS. 7 and 9 of the drawings, and which are essentially of a configuration similar to that of electrical socket plug outlets formed in the upper end of the fitting, as shown in FIG. 3 of the drawings.

At diametrically opposite edge regions of the disc-shaped member 52, there are formed slots 58 and 60 which extend radially inwardly and terminate in semicircular or rounded inner ends, and which slots are adapted to receive break-through plug members for a purpose as described hereinbelow.

The rear surface of the plate 52, that facing downwardly towards the floor aperture, includes raised portions surface 62 which extend about the circumference of the plate member and also generally about the apertures 54 and 56, the latter of which, at their junctures, form a continuous profiled opening. Projecting from the rear surface of the upper plate member 52 are a pair of short pins 62, preferably, although not necessarily, spaced opposite each other in proximity with the inner ends of the respective slots 58 and 60, and which may also be constituted of brass, and integrally formed with or welded to the plate member 52.

As illustrated in FIGS. 10 through 12 of the drawings each of the apertures or cutouts 54 and 56 is adapted to receive a flap 64, which similar to plate member 52 is constituted of a metallic material such as brass, and in which each flap 64 has perimetral dimensions substantially in conformance with that of each respective cutout 54 and 56 in the plate member 52 in which it is adapted to be received. A rearwardly extending flange or protrusion 66 extends somewhat recessed about the perimetral edge of each flap 64, a hinge structure 68 consisting of two spaced hinge extension plates 68a, 68b which project perpendicular to the plane of flap 64 is formed at one end thereof. Extending between and fastened to the pair of spaced hinge plates 68a, 68b is a hinge pin 69, about which there is wound a helical coil spring 72.

Figure 5:
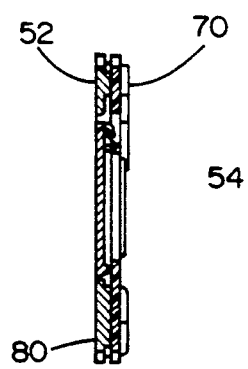
FIG. 5 is a section taken along line 5—5 in FIG. 4.
Figure 6:
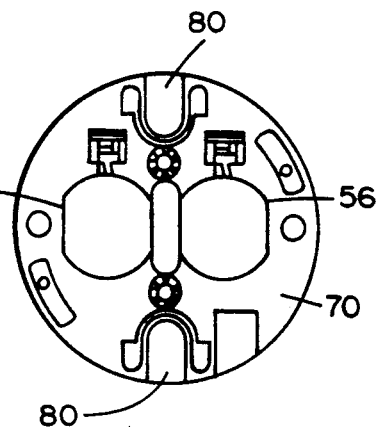
FIG. 6 illustrates a bottom plan view of the flap cover plate assembly structure.

Positioned in surface contact with the rear surface of the brass cover plate member 52 is a rear or lower plate member 70 whose circumferential dimensions are essentially identical with those of the upper plate member 52, as shown in FIG. 5 of the drawings.

The rear plate member 70 includes a pair of central cut-outs 72, 74 which are adapted to be in alignment with the openings 54 and 56 in the plate member 52, but which are somewhat smaller in size and separated by a connecting web 76, whereby each of the plate surfaces about the openings 72 and 74 is adapted to be contacted by the rear flange or shoulder 66 on each respective flap 64 so as to prevent the upper face of the flap 64 from pivoting down below the upper surface of the plate member 52 in the closed condition of each flap 64 and to resultingly remain coplanar therewith. Moreover, the lower plate member 70 is also provided with a pair of small through-holes 78 which are located in alignment with the pins 62 and adapted to receive these therein, with the rear or lower end of each opening 78 being widened in diameter thereof. Consequently, upon the pins 62 being extended therethrough upon the superposition of the plates 52 and 70, the ends of the pins which project from the rear surface of the plate 70 are then peened so as to expand and consequently produce a permanent attachment between the plate members 52 and 70 to provide an integral flap cover structure 50. Moreover, the flap cover structure 50 may be provided with suitable through apertures to enable screw members to pass therethrough and fasten the flap cover unit 50 in the central cup-shaped recess portion of the carpet flange 36 through the intermediary of suitable threaded fasteners (not shown).

The raised surface portion 62 on the rear surface of the upper brass plate member 52, and the thereto facing surface of the rear plate member 70 form a recessed perimetral groove therebetween, as seen in FIG. 5, and this will enable a plug 80 to be positioned in each respective diametrically opposite slot 58 and 60.

As shown in FIGS. 16 through 18, each plug 80 has an upper surface dimension commensurate with the size and length of slot 58 and, respectively, 60, and a lower lateral or side flange portion 82 which will fit into a groove between the upper plate member 52 and the lower plate member 70 so as to clamp the plug 80 therebetween. A slotted portion or undercut 84 of generally curvilinear or part-circular shape is formed in each plug 80 so that, if it is desired to pass low power cables; for example, such as for telecommunication signals, through the fitting, it is merely necessary to remove the plug 80 and break away the inner circular portion 86 thereof so as to form a circular opening upon reinsertion of the remaining radially outer plug portion 88 between the plates into the slots 58, 60. As in the instance of the flaps 64, each plug 80 may also be constituted of a metallic material such as brass, which is provided with a surface finish similar to that of the upper brass plate member 52 and carpet flange 36 so as to produce a uniform and smooth overall surface appearance. In order to bias the flaps 64 into normally closed positions in which their upper surfaces are coplanar with the upper surface of the plate member 52, the helical coil spring 72 which extends about each respective hinge pin 69 of the flaps 64 is provided with oppositely radially outwardly projecting end portions which biasingly engage, respectively, the surface of the hinge portion 68 of the respective flap 64 and the surface of the lower plate member 70. Consequently, when biased into an open position, each flap 64 will be imparted a torsional biasing force by the spring 72 tending to normally pivot the flap closed upon release thereof or removal of a plug connector extending through the apertures 58 or 60 in the flap cover assembly 50.

Preferably, although not necessarily, the lower plate member 70 is formed from a rigid, high-strength plastic material, for example, such as polycarbonate or, preferably, ABS resin (acryonitrile-butadiene-styrene copolymer).

The foregoing composite construction of the flap cover plate assembly 50 enables the easy assembling of the various components, and concurrently reduces the amount of expensive and heavy brass material employed therein, while providing for a sturdy and high-strength structure which is protective of the electrical components of the fitting located beneath the flap cover assembly, while imparting an aesthetically attractive appearance to the service head when mounted on a carpet floor.

While there has been shown and described what is considered to be a preferred embodiment of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed:

1. In a poke-through wiring fitting for insertion into an aperture extending through a concrete slab floor aperture of a building structure, said fitting facilitating transmission of electrical power and telecommunication signals between a service head and a junction box located at opposite sides of the floor; and channel means of said fitting for conducting insulated wires for the electrical power and the telecommunication signals between said junction box and said service head, said service head including flap cover plate structure positionable above the upper face of said floor so as to cover the floor aperture, the improvement comprising:

said plate structure including an upper metallic plate member and a lower plate member of a rigid non-metallic material; means for fastening said lower plate member to a lower surface of said upper metallic plate member, openings for electrical plugs being formed in aligned relationship in said upper and lower plate members; flap means being located in each of the openings in said upper plate member and hingedly connected to said upper plate member for pivotable opening and closing movement relative to said openings; resilient biasing means operatively connected to said upper and lower plate members and said flap means for biasing said flap means into normally closing positions into the openings of said upper plate member, said upper and lower plate members having circumferentially spaced radially inwardly extending slots spaced about the circumferences thereof; and break-out plug means being insertable into each said slot and having upper surfaces coplanar with the upper surface of said upper plate member.

2. A wiring fitting as claimed in claim 1, wherein said flap means in the closed condition has an upper surface which is coplanar with the upper surface of said upper plate member.

3. A wiring fitting as claimed in claim 1, wherein each said resilient biasing means comprises a helical coil spring having radially extending end portions spaced hinges on said flap means; pin means extending between said hinges and having said coil spring arranged thereon, on said projecting end portion of said coil spring operatively contacting said flap means proximate said hinges and the projecting end portion at the opposite end of said coil spring engaging said lower plate member for imparting a torsional force to said flap means to normally close the latter over said openings.

4. A wiring fitting as claimed in claim 1, wherein each said plug means includes laterally extending flanges engageable into complementary grooves formed between mating surfaces on said upper and lower plate members so as to clampingly retain said plug means in said slots.

5. A wiring fitting as claimed in claim 4, wherein at least portions of said plug means are breakable therefrom so as to form openings proximate the radially innermost ends of said slots to facilitate the through-passage of insulated electrical or telecommunication cables.

6. A wiring fitting as claimed in claim 1, wherein said openings for electrical socket plugs in said lower plate member are dimensioned to receive socket plugs in close-fitted relationship therewith.

7. A wiring fitting as claimed in claim 1, wherein said fastening means comprises pins projecting from the bottom surface of said upper plate member into holes extending through said lower plate member, said pin means having free ends which are deformable for fixedly attaching said lower plate member to said upper plate member.

8. A wiring fitting as claimed in claim 1, wherein said upper plate member, said flap means and said plugs are each constituted of brass.

9. A wiring fitting as claimed in claim 1, wherein said lower plate member consists of a rigid, high-strength plastic material.

10. A wiring fitting as claimed in claim 9, wherein said plastic material consists of a polycarbonate.

11. A wiring fitting as claimed in claim 9, wherein said plastic material consists of an acrylonitrile-butadiene-styrene copolymer (ABS) resin.

12. A wiring fitting as claimed in claim 1, wherein a ring-shaped flange includes a central cup-shaped recess for mounting said flap cover plate structure therein such that the upper surface of the upper plate member of said structure is essentially coplanar with the uppermost surface of said flange, said flange being adapted to be positioned on a carpet covering the surface of the building floor.

13. A wiring fitting as claimed in claim 12, wherein said carpet flange is constituted of brass.

14. A wiring fitting as claimed in claim 12, wherein screw fastener means fasten said flap cover plate structure to said carpet flange.

* * * * *